April 21, 1959  F. C. G. BERTHIEZ  2,882,758
SYSTEM FOR BLOCKING AND ROTATING A TURRET
Filed July 20, 1955  2 Sheets-Sheet 1
Fig. 1
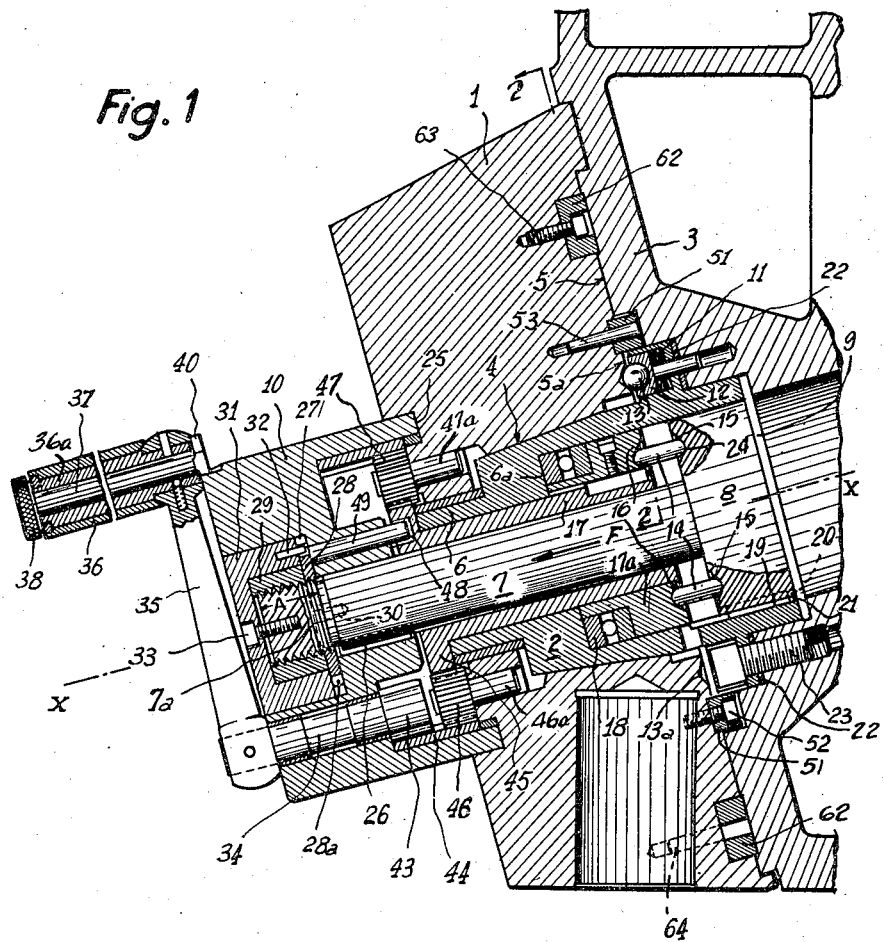
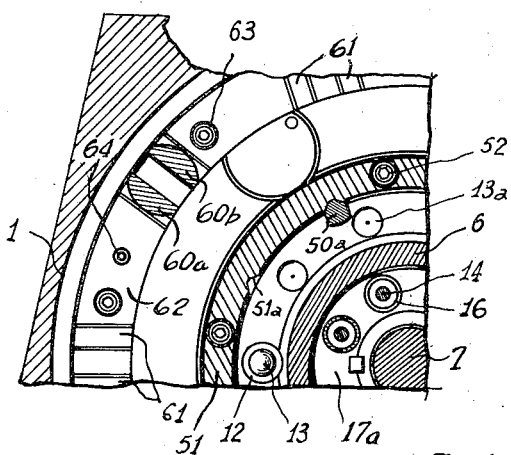
Fig. 2
Frederick Charles Gilbert Berthiez
INVENTOR
By George H. Corey
His Attorney

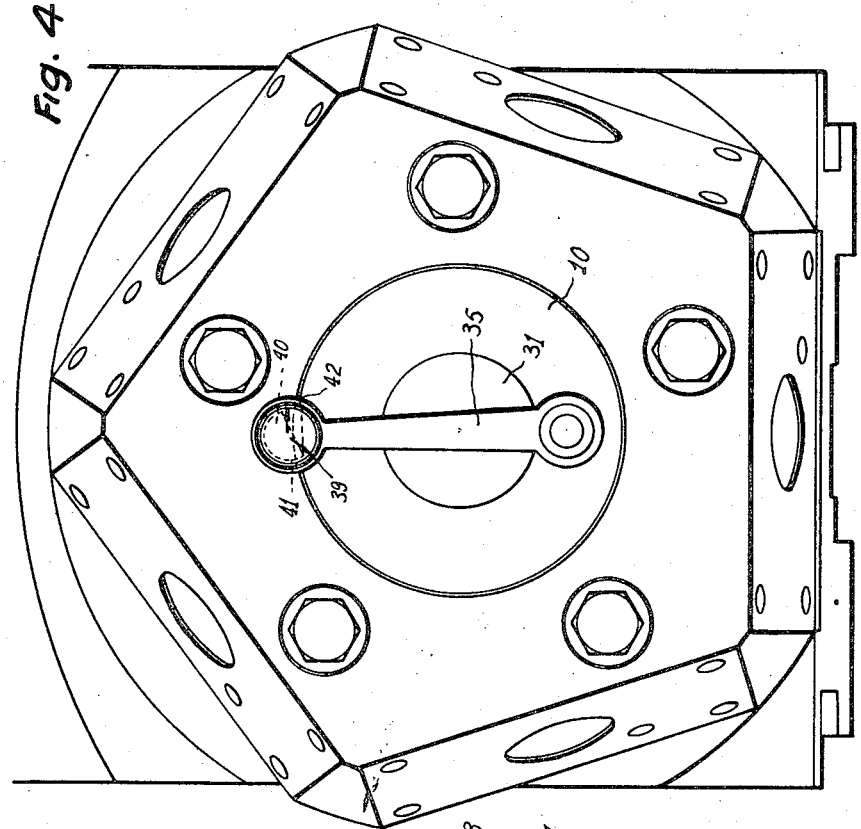
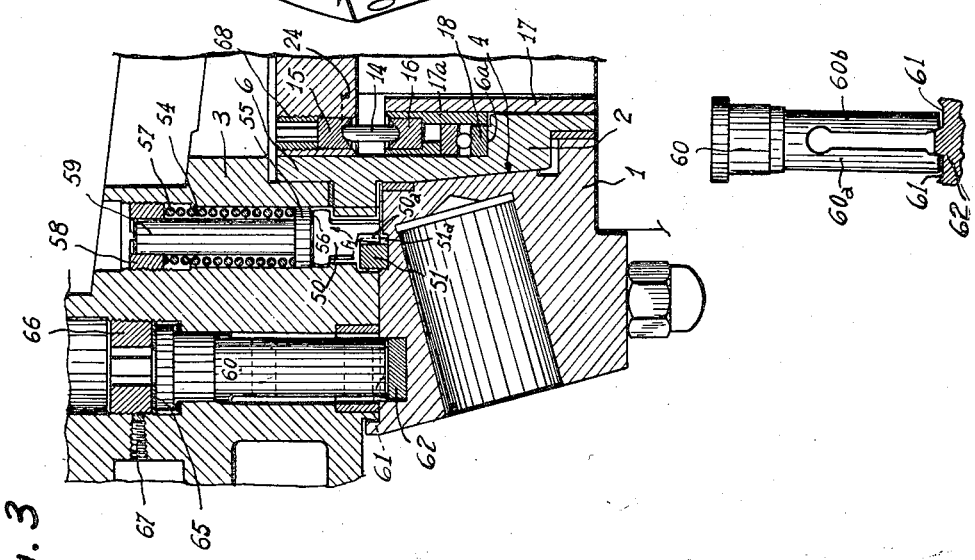

United States Patent Office 2,882,758
Patented Apr. 21, 1959

2,882,758

SYSTEM FOR BLOCKING AND ROTATING A TURRET

Frederick Charles Gilbert Berthiez, Lamorlaye, France, assignor to Société Anonyme des Anciens Etablissements Charles Berthiez, Paris, France Application July 20, 1955, Serial No. 523,340

Claims priority, application France May 23, 1955

8 Claims. (Cl. 74—822)

The present invention relates to a revolving turret or capstan for high precision machine tools adapted to be indexed to its various positions without involving any complicated operations on the part of the user.

According to an essential feature of the invention, in order respectively to rotate and to clamp the turret, use is made of the rotary movement of certain elements in two steps in a forward direction, the turret being released in the first step and being rotated in the second step and being clamped upon reverse rotation of the elements.

For such purpose the rotation and clamping of the turret are controlled by means of an epicyclic gear train centered on the axis of the turret and including:

An operating ring gear mounted in a member adapted to follow the turret in its longitudinal displacements;

Two planetaries mounted on the turret for rotation on their axes relative to the turret;

A sun gear limited rotation of which releases the turret from the indexing means thereof and adapted, on said rotation being arrested, to serve as a fixed sun gear permitting rotation of the planetaries.

Furthermore, in constructing a turret of the type thus specified, it is contemplated that the turret will be provided with certain ancillary devices and will be constructed in accordance with a particularly appropriate design.

Thus, all delicate parts involved in the centering or indexing of the turret of the invention are retracted during the various movements imparted to the turret and are not, therefore, used as sliding or runway surfaces. The turret is applied during operation against flat and conical surfaces providing ample support therefor. During its rotation the turret pivots about a journal separate from its supporting faces. Finally, in order to develop the large forces required for clamping the turret in place, a set of toggle links is used uniformly spaced about the axis of rotation and having their ends resting in two generally aligned sets of cups and adapted to be rotated with respect to one another, this arrangement being located within the fixed block on which the turret is supported, the stresses developed being transferred outwardly over a shaft having its end provided with a stirrup block which clamps the turret in cooperating relation to its supporting faces.

According to a further and final feature, the user "feels" the indexed positions through ball points and the turret is clamped in such positions by biased retractable detents engageable with notches in the turret and adapted to compensate for any unbalanced mass or bias in the latter.

A clearer understanding of the invention will be had from the ensuing description taken with reference to the accompanying drawings wherein:

Fig. 1 is a longitudinal section showing the detail of the mechanism;

Fig. 2 is a transverse section on line 2—2 of Fig. 1;

Fig. 3 is a partial longitudinal section with certain modifications and showing the arrangement of the auxiliary components located behind the turret;

Fig. 4 is a front view of the turret;

Fig. 5 shows a detail of a positioning finger.

The turret 1 is engaged over a stationary conical journal member 2 projecting from a frame 3. The turret also is supported on the stationary frame 3 against the flat bearing surface 5 and barely touches the conical journal surface 4 which serves as a centering means. Secure clamping requires an accurate positioning of the journal member 2 along its axis with respect to the frame 3. Nevertheless, after accurate adjustment has been performed by means to be described later, the turret is firmly seated upon its bearings.

However, in order to avoid excessive wear of the centering and bearing surfaces 4 and 5 on rotation of the turret 1, the turret is lifted clear of these surfaces by being retracted in the direction of arrow F. The turret in this retracted position may be rotated on the trunnion 6 formed on the end of the journal member 2. The displacements of the turret along its axis in the direction indicated by arrow F and in the opposite direction are produced by a unitary system comprising a shaft 7 which extends coaxially through the conical journal member 2 and the turret and terminates at one end, within the journal member 2, in a head 8 movable in a chamber 9, while at its other end outside the journal member 2 the shaft has secured to it a block 10 adapted to abut against the front face of the turret in a groove at 25. The thrust exerted on the turret in the direction indicated by arrow F is developed by springs 11 housed in blind recesses in a flange on the journal member 2 disposed in an annular shoulder in the frame 3, springs 11 acting on pistons 12 in which are received balls 13 adapted to roll on the face 5a of the turret 1.

Conversely to pass from the retracted position to that of Fig. 1, it is only necessary to apply pressure in the space at the left of the head 8 and to maintain such pressure in order to lock the system in clamping position.

In Figs. 1 and 3 the system in which the clamping forces are generated comprises a set of toggle elements 14 which may assume positions along an hyperboloid of revolution and having their ends resting against two circumferentially disposed sets of cups or seats 15 and 16 respectively formed in the head 8 of the shaft 7 and in a part 17a secured to bushing 17 slidably and rotatably fitted around the shaft 7 and disposed within the journal member 2. The bushing 17, however, is fixed in position along the axis X—X of the system and the part 17a supports a ball bearing 18 resting against an internal shoulder 6a of the conical journal member 2. The shaft and head 8, on the other hand, are prevented from rotating owing to the provision of a key 19, Fig. 1, engaged in two keyway slots 20 and 21 respectively in the head 8 and the journal member 2. Rotation of the bushing 17 and part 17a carrying seats 16 in a direction to lay down the toggle links 14 flat allows the shaft 7 to be displaced in the direction shown by arrow F, such displacement being caused by the springs 11 acting on the turret 1 and hence on the block 10 secured to the shaft 7. On the other hand, if the bushing 17 and part 17a are revolved to positions in which the toggle links 14 assume positions parallel to the axis X—X the head 8 and shaft 7 are displaced in the direction opposite to arrow F.

The journal member 2 is mounted on the frame 3 through interposed washers 22 permitting depth adjustment and is secured by a set of screws 23 and conical centering pins not shown.

Adjustment of the clamping force is obtained by modifying the distance as measured along the axis X—X between the bottom wall 24 of the cup 15 and the plane of abutment 25 between the block 10 and the turret 1. For this purpose the block 10 which is formed as a body of revolution about the axis X—X is slidable along the shaft 7 while being keyed thereto by keyway 26. The block 10, however, is adjustably secured to the end of shaft 7. For this purpose the shaft 7 has a terminal threaded portion 7a projecting into a chamber 27 formed in the block 10, and on this portion 7a is threaded a nut 29. On this portion 7a also is disposed an unthreaded washer 28, the block 10 being forced against the washer 28 as the turret is urged leftward by the springs 11. The nut 29 is adapted to assume 150 positions per turn and the thread may be such that the adjustment of the turret can thus be effected to an approximation of 13 microns. To this end a pin 30 embedded in the block 10 and engaged between teeth 28a of the washer 28 allows the washer to be locked in a selected position. A cap 31 fits over nut 29 and also seals the chamber 27 and a pin 32 mounted in the cap engages teeth 28a of the washer 28. If the nut is hexagonal and the washer 28 has 25 teeth, it is possible to position the cap correctly in a selected one of the 150 adjusted positions. In this way, the cap 31 secured on the shaft 7 by means of a countersunk hexagon headed screw 33 provides a positive rotation arrester for the nut 29.

Means will now be described whereby rotation of a crankhandle from the exterior will make it possible, in a first stage, to rotate the bushing 17 so as to release the toggle links 14 and consequently allow the turret 1 to recede as shown by arrow F, and in a second stage to rotate the turret 1 about the journal 6.

The block 10 is traversed by a crankshaft 34 having secured to its outer end a crankarm 35 with an end handle 36. The handle comprises a tube carried on a sleeve 36a secured at one end in the outer end of the crankarm 35. Pin 37 is journalled in the sleeve 36a and is adapted to be rotated therein by means of a knurled knob 38. In either one of its positions indicated by arrow-heads 39, Fig. 4, the knurled knob 38 through pin 37 operates a pawl 40 formed at the end of pin 37 and adapted to abut one or the other of two notches 41 and 42 in the block 10, thereby permitting the crank to be turned only in the direction indicated by the arrow tangent to the circumference described by the axis of pin 37 about the axis X—X. The crankshaft 34 is fitted, inside the block 10, with a pinion 43 in mesh with an internally toothed annulus 44 rotatably mounted in the block 10. This toothed annulus 44 provides an outer ring gear of an epicyclic gearing, wherein the inner sun gear consists of a pinion 45 secured to the bushing 17 and the planetaries are two pinions 46 and 47 mounted on spindles 46a, 47a secured in the turret 1.

With the block 10 fixed against rotation by key 19, rotation of the crank operates the planetary gearing which will operate in one of two different ways, according as the bushing 17 is free and the turret 1 clamped, or the bushing 17 is blocked against rotation and the turret 1 is free for rotation.

The first instance will occur when the assembly is in the position shown in Fig. 1, i.e., with the turret clamped. The turret is held by means to be later described and the bushing 17 is free for rotation. Rotation of the crank will therefore cause rotation of the bushing and hence rotation of the seats 16 in the direction which will lay the toggle links 14 flat so that the head 8 of shaft 7 will be moved in the direction indicated by the arrow F under the action of the springs 11 applied against the turret, which thereby will be lifted off its flat and conical bearings. The kinematic gearing would continue to behave in the same way if there were not provided in the pinion 45 an arcuate groove 48 in which is engaged a pin 49 rigid with the block 10. In this way the bushing 17 is rotated until the end of the arc of the groove has contacted the pin 49. At such time, upon continued rotation of crank 35 in the same direction, the bushing 17 will remain stationary and the turret will commence revolving. It will be understood that the angle by which the bushing 17 is rotated in the operations just stated is such that the turret 1 will have receded sufficiently so that it will be clear of all of the indexing means provided. Moreover, when one starts from the initial position, the arc of the groove 48 is symmetrical to either side of pin 49, so that if the crank 35 were started to be rotated in the opposite direction, the bushing 17 would pivot by a symmetrical angle and the raising of the turret would occur under similar conditions as before for an identical amount of rotation of the turret.

Thus, it is only necessary for the operation to rotate the crank continually in the same direction first to lift or back the turret and then to rotate it. The termination of the lifting stage is felt as the end of groove 48 abuts the pin 49. The angle of crank rotation required to back the turret fully off its bearings, with due allowance for the reduction ratio of the planetary gearing, is about 75°, and when the backing-off step is completed and the turret is being rotated, $\frac{1}{10}$ of one revolution of the turret is obtained for one revolution of the crank, so that the turret can be positioned in any one of its five main positions as well as in its five secondary, intermediate positions.

For each of these ten positions, the turret presents a taper cavity 13a in registry with one of the balls 13, so that the depth of the ball projecting into the cavity will be equal to the predetermined amount by which the turret is backed off. Thus the pressure applied by the springs 11 on the turret will be the same when the turret is in indexed position and against the flat bearing surface 5 as when the turret is clear and the balls are rolling on the face 5a of the turret. In these conditions, the springs 11 counteract the self-clamping tendency of the turret when the latter is subjected to certain stresses and allow "feel" of the indexing positions during rotation of the crank 35.

The turret is clamped by turning the crank 35 backwards after an indexing position has been "felt." Such backward movement of the crank causes rotation of bushing 17 in such a direction that the pin 49 moves in the groove 48, the turret 1 then remaining stationary because the balls 13 are engaged in the respective cavities 13a. During the final stage of the clamping action, the turret settles upon the indexing means described hereinafter until finally the crank strikes against its latch.

To hold the turret in place after releasing the crank in an indexing position, a rocking finger 50 is provided rockable in the direction shown by arrow $f_1$, Fig. 3, and terminating in a tooth 50a which is engageable in notches 51a corresponding to the indexing positions and formed in an annulus 51 secured to the turret on the rear face thereof. The annulus 51 is secured to the turret by countersunk hexagonal headed screws 52 and tapered centering studs 53. However the finger 50 should be biased to enable the operator to estimate and adjust the torque required to oppose the unbalance of the turret. For this purpose, engaged into a bore 54 in the frame 3, is a piston 55 which presses at 56 upon the finger 50 and is retained by a spring 57 bearing against a screw plug 58 threaded in frame 3 and formed with a bore through it for guiding the piston rod 59. By adjusting the screw plug 58 the operator is able slightly to relax the force required to be applied on the crank 35 and, moreover, the finger 50 as it engages into the notches 51a produces a snapping effect which indicates to the operator that the indexing position has been attained.

The indexing fingers are shown in Fig. 3 and consist of clamps 60 shown in greater detail in Fig. 5, and engaging into radial grooves 61, Fig. 2, formed in an annulus 62 also mounted on the rear turret face, and secured by countersunk screws 63 having hexagon heads and by taper centering pins 64.

The positioning finger 60 is held in engagement with the turret by a spring 65 which takes up the play that would be produced in the notches as a result of wear. At the same time, a resiliently deformable means comprising a two-armed clamp 60a and 60b takes up the circumferential backlash of the fingers required for a slight axial displacement thereof to take up wear in the notches. The grooves 61 in the annulus have tapered sides and complementarily, the ends 60a and 60b of the clamp 60 are chamfered. A screw plug 66 permits adjustment of the bias of spring 65 and is locked in position by a set screw 67.

In order to adjust the degree of clamping achieved by the toggle links 14, during manufacture the socket annulus 15 when provided is in the modification of Fig. 3 may be adjusted in position along the axis X—X by means of hexagon socket screws 68 which may be prick punched after adjustment to set the position of the annulus 15.

It will be understood that the invention is not restricted to the embodiment described and illustrated, which is given by way of example only.

I claim:

1. A machine assembly comprising a frame, a member supported by said frame for rotation of said member on an axis and relative to said frame, clamping means operatively connected to said frame and to said member and operable to a given position for clamping said member to said frame and to another position for releasing said member for rotation thereof on said axis relative to said frame, a ring gear supported by said frame coaxially with and for forward and reverse rotation on said axis of rotation of said member, a sun gear supported by said frame coaxially with and for rotation on said axis and operatively connected to said clamping means for operating said clamping means to said other position and to said given position respectively upon rotation of said sun gear in a forward direction and in the reverse direction, a planet gear in mesh both with said ring gear and with said sun gear and supported by said rotatable member for movement about said axis with said member and for rotation of said planet gear on its axis relative to said member, means supported by said frame and disposed in a position to engage said sun gear in the position thereof to which said sun gear is forwardly rotated corresponding to said released position of said clamping means to prevent continued forward rotation of said sun gear relative to said frame on said axis of said member, said planet gear being supported by said rotatable member so as to effect rotation of said member on said axis of said member to a selected position upon continued forward rotation of said ring gear on said axis of said member with said sun gear held by said preventing means in said forward position thereof, said preventing means disengaging said sun gear in said forward position of said sun gear to provide for reverse rotation of said sun gear upon reverse rotation of said ring gear so as to effect movement of said clamping means to said given position to clamp said member in the position to which it has been rotated, and ring gear operating means connected to said ring gear and operable to effect said forward and reverse rotations of said ring gear.

2. A machine assembly as defined in claim 1 in which said given position of said clamping means is disposed between two releasing positions of said clamping means at opposite sides of said given position, said means for preventing continued rotation of said sun gear being engageable with said sun gear in either of two forward positions of said sun gear angularly displaced from and at opposite sides of a middle position of said sun gear, whereby said rotatable member may be unclamped and rotated in either direction to a selected position upon rotation of said ring gear on said axis selectively in one direction and the other.

3. A machine assembly as defined in claim 1 in which said rotatable member is supported for movement thereof along said axis of rotation of said member between its clamped position and its released position, and means engaging said member to bias said member to move toward said released position thereof.

4. A machine assembly as defined in claim 1 in which said rotatable member is supported for movement thereof along said axis of rotation between its clamped position and its released position and for rotation of said member in said released position upon said axis of said member, a first part supported by said frame for movement of said part together with said rotatable member along said axis of said member, means operatively connected to said first part for preventing rotational movement of said first part on said axis of said member while providing for said rotational movement of said rotatable member, a second part supported by said frame for rotation thereof on said axis of said member relative to said frame and relative to said rotatable member, means operatively connected to said second part for preventing movement of said second part along said axis relative to said frame, said second part carrying said sun gear for rotation therewith, said first and second parts respectively having faces disposed transverse to and spaced along said axis of said rotatable member in opposed relation to each other and having in the respective faces pockets regularly distributed peripherally about said axis of said member, and toggle links disposed with their respective ends in said pockets respectively in said faces of said first and second parts, said toggle links extending parallel to said axis in the clamped position of said rotatable member and in angular relation to said axis of said member in the released position of said rotatable member.

5. A machine assembly as defined in claim 4 in which said given position of said clamping means is disposed between two releasing positions of said clamping means at opposite sides of said given position, said means for preventing continued rotation of said sun gear being engageable with said sun gear in either of two forward positions of said sun gear angularly displaced from and at opposite sides of a middle position of said sun gear, whereby said rotatable member may be unclamped and rotated in either direction to a selected position upon rotation of said ring gear on said axis selectively in one direction and the other, said toggle links engaging said pockets in the respective faces of said first and second parts so as to provide for movement of said toggle links to said angular relation to said axis of said member for either direction of rotation of said sun gear from said middle position thereof.

6. A machine assembly as defined in claim 4 in which said first part provides means for supporting said ring gear for rotation relative to said part on said axis of said member.

7. A machine assembly as defined in claim 6 which comprises a pinion supported by said first part for rotation on the axis of said pinion and in meshing engagement with said ring gear, said ring gear operating means comprising manually operable means supported by said first part and operatively connected to said pinion and operable for effecting rotation of said pinion to effect rotation of said ring gear on said axis of rotation of said rotatable member.

8. A machine assembly comprising a frame, a member supported by said frame for rotation of said member on an axis and relative to said frame, clamping means operatively connected to said frame and to said member and operable to a given position for clamping said member to said frame and to another position for releasing said member for rotation thereof on said axis relative to said frame, an element supported by said frame coaxially with and for rotation on said axis of said member and operatively connected to said clamping means for operating said clamping means to said other position and to said given position respectively upon rotation of said element in a forward direction and in the reverse direction, means supported by said frame and disposed in a position to engage said element in the position of said element to which it is forwardly rotated corresponding to said released position of said clamping means to prevent continued forward rotation of said element relative to said frame on said axis of said member, and operating means operatively connected to said rotatable member and to said preventing means and operable for effecting rotation of said member on said axis of said member to a selected position with said element held by said preventing means in said forward position of said element, said operating means being operatively connected to said element and operable for effecting rotation of said element in the reverse direction, said preventing means disengaging said element in said forward position of said element to provide upon said reverse operation of said operating means for reverse rotation of said element to effect movement of said clamping means to said given position to clamp said member in the position to which it has been rotated.

References Cited in the file of this patent

UNITED STATES PATENTS

| | | |
|---|---|---|
| Re. 22,455 | Wilson | Mar. 14, 1944 |
| 993,290 | Bullard | May 23, 1911 |
| 1,690,568 | Bullard | Nov. 6, 1928 |
| 2,341,255 | Wilson | Feb. 8, 1944 |
| 2,383,549 | Hilker | Aug. 28, 1945 |